(12) United States Patent
Chang et al.

(10) Patent No.: US 9,536,064 B2
(45) Date of Patent: Jan. 3, 2017

(54) METHOD OF OPERATING AN ELECTRONIC APPARATUS

(71) Applicant: Wistron Corporation, New Taipei (TW)

(72) Inventors: Yung-Yen Chang, New Taipei (TW); Tsung-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 182 days.

(21) Appl. No.: 14/187,322

(22) Filed: Feb. 24, 2014

(65) Prior Publication Data

US 2015/0113256 A1 Apr. 23, 2015

(30) Foreign Application Priority Data

Oct. 22, 2013 (TW) .............................. 102138149 A

(51) Int. Cl.
| | | |
|---|---|---|
| *G06F 1/32* | (2006.01) | |
| *G06F 21/31* | (2013.01) | |
| *G06F 21/57* | (2013.01) | |

(52) U.S. Cl.
CPC ................ *G06F 21/31* (2013.01); *G06F 1/32* (2013.01); *G06F 21/572* (2013.01)

(58) Field of Classification Search
CPC .................. G06F 1/32; G06F 1/26; G06F 1/28
USPC ....... 713/300, 310, 320, 321, 322, 323, 324, 713/330, 340, 375
See application file for complete search history.

(56) References Cited

U.S. PATENT DOCUMENTS

| | | | | |
|---|---|---|---|---|
| 8,560,004 | B1 * | 10/2013 | Tsvetkov ................ | H04M 1/67 310/328 |
| 2005/0257050 | A1 * | 11/2005 | Gierens ................... | G06F 21/31 713/165 |
| 2008/0104388 | A1 * | 5/2008 | Kim ....................... | G06F 21/305 713/2 |
| 2010/0130181 | A1 * | 5/2010 | Won ........................ | H04M 1/67 455/414.1 |
| 2010/0228937 | A1 * | 9/2010 | Bae ...................... | G06F 12/1458 711/163 |

(Continued)

FOREIGN PATENT DOCUMENTS

| | | |
|---|---|---|
| CN | 1845038 | 10/2006 |
| CN | 101410781 | 4/2009 |

(Continued)

OTHER PUBLICATIONS

"Office Action of Taiwan Counterpart Application," issued on Apr. 24, 2015, with English translation thereof, p. 1-p. 16.

*Primary Examiner* — Jaweed A Abbaszadeh
*Assistant Examiner* — Keshab Pandey
(74) *Attorney, Agent, or Firm* — Jianq Chyun IP Office

(57) ABSTRACT

An operation method of an electronic apparatus is provided, wherein a setting procedure of safety mechanism is executed first. The procedure includes: receiving a setting operation through a setting interface so as to select plural sensing units from a sensing unit group; creating a unlocking information according to the setting operation, wherein the unlocking information includes an enabling sequence of the selected sensing units; making the unlocking information associated with the operation function. After finishing the setting procedure of safety mechanism, when a trigger event conforming to the unlocking information is received, the operation corresponding to the unlocking information is executed.

10 Claims, 8 Drawing Sheets

(56) References Cited

U.S. PATENT DOCUMENTS

| | | | | |
|---|---|---|---|---|
| 2010/0306718 A1* | 12/2010 | Shim | ............... | G06F 3/04883 715/863 |
| 2011/0041102 A1* | 2/2011 | Kim | ............... | G06F 3/04883 715/863 |
| 2011/0078786 A1* | 3/2011 | Kwong | ............... | G06F 21/31 726/18 |
| 2013/0113723 A1* | 5/2013 | Chen | ............... | G06F 21/30 345/173 |
| 2013/0147795 A1* | 6/2013 | Kim | ............... | G06F 21/36 345/419 |
| 2013/0265135 A1* | 10/2013 | Chang | ............... | G06F 21/36 340/5.51 |
| 2014/0109217 A1* | 4/2014 | Park | ............... | G06F 21/44 726/17 |
| 2014/0325234 A1* | 10/2014 | Shiyafetdinov | ....... | G06F 21/602 713/182 |

FOREIGN PATENT DOCUMENTS

| | | |
|---|---|---|
| CN | 101609383 | 12/2009 |
| CN | 102109927 | 6/2011 |
| TW | 551522 | 9/2003 |
| WO | 2007089766 | 8/2007 |

\* cited by examiner

METHOD OF OPERATING AN ELECTRONIC APPARATUS

CROSS-REFERENCE TO RELATED APPLICATION

This application claims the priority benefit of Taiwan application serial no. 102138149, filed on Oct. 22, 2013. The entirety of the above-mentioned patent application is hereby incorporated by reference herein and made a part of this specification.

BACKGROUND OF THE INVENTION

Field of the Invention

The present invention generally relates to a safety mechanism of an electronic apparatus, and more particularly, to a method of operating an electronic apparatus using plural sensing units to set a safety mechanism.

Description of Related Art

In the age of technological progress, along with emergence of electronic apparatuses with operation capability such as cell phones, tablet computers, notebooks and desktops, the lives and the work habits of people have been changed. Many users prefer to store their important and private data in an electronic apparatus. With the increasing safety awareness of people on the personal data, it is well known to use passwords for controlling the accessing the resources such as computers, databases and communication devices, wherein prior to access the required resources, the user needs to enter a correct password as the verification of authorization for the user to access the required resources. Therefore, in our daily life, almost everywhere you can find a variety of forms of password usages. As a result, how to improve the using safety of an electronic device has become an important issue for the technological development today.

SUMMARY OF THE INVENTION

Accordingly, the present invention is directed to a method of operating an electronic apparatus, providing various encryption methods through a sensing unit group to improve the operation safety of the electronic apparatus.

The invention provides a method of operating an electronic apparatus, wherein the electronic apparatus has a sensing unit group with a plurality of sensing units. The method includes: receiving a trigger event, wherein the trigger event is generated by the sensing units selected in the sensing unit group to sense a specific operation behavior of a user; judging whether or not the trigger event conforms to a unlocking information; when the trigger event conforms to the unlocking information, executing an operation function corresponding to the unlocking information.

In an embodiment of the present invention, before the step of receiving the trigger signal, executing a setting procedure of safety mechanism, and the setting procedure of safety mechanism includes: receiving a setting operation corresponding to the specific operation behavior through a setting interface of the electronic apparatus so as to select a plurality of ones among the sensing units in the sensing unit group; creating the unlocking information according to the setting operation, in which the unlocking information includes an enabling sequence of the selected sensing units; and making the unlocking information associated with the operation function.

In an embodiment of the present invention, the above-mentioned setting interface includes a plurality of setting items, in which the quantity of the setting items is corresponding to the quantity of the sensing units of the sensing unit group; the setting items respectively have a corresponding identifying information; relative positions of the setting items in the setting interface are corresponding to real relative positions of the sensing units comprised by the sensing unit group at the electronic apparatus. The step of creating the unlocking information according to the setting operation includes: selecting a plurality of selected items among the setting items according to the setting operation and obtaining the identifying information corresponding to each of the selected items; detecting a selecting sequence of the selected items; and setting the enabling sequence of the selected sensing units according to the selecting sequence.

In an embodiment of the present invention, the above-mentioned unlocking information further includes a sensitive time of each of the selected sensing units. The step of creating the unlocking information according to the setting operation further includes: setting the sensitive time according to a staying time by selecting each of the selected items.

In an embodiment of the present invention, the above-mentioned method further includes: executing the setting procedure of safety mechanism through a boot firmware unit; and storing the unlocking information into a memory unit of a control unit.

In an embodiment of the present invention, the above-mentioned operation function is a boot action, and the electronic apparatus includes a control unit, a boot firmware unit, a power-enabling unit and a display unit, in which the control unit is coupled to the power-enabling unit, the boot firmware unit and the display unit. The method, after finishing the operation of executing the setting procedure of safety mechanism, further includes: delivering a notice signal to the boot firmware unit through the control unit when the electronic apparatus is under a boot mode state and if the power-enabling unit receives a power-enabling signal; displaying a prompt message at the display unit through the boot firmware unit; and receiving the trigger event from the sensing unit group through the control unit and judging whether or not the trigger event conforms to the unlocking information.

In an embodiment of the present invention, after the step of judging whether or not the trigger event conforms to the unlocking information, the above-mentioned method further includes: when the trigger event conforms to the unlocking information, judging whether or not receiving the power-enabling signal from the power-enabling unit within a preset time; executing the boot action through the boot firmware unit if receiving the power-enabling signal within the preset time; and displaying the prompt message at the display unit through the boot firmware unit if not receiving the power-enabling signal within the preset time.

In an embodiment of the present invention, the above-mentioned method further includes: when the electronic apparatus is under a shutdown mode state, supplying power to the control unit and the boot firmware unit by an electricity-saving unit; when the electronic apparatus is under the shutdown mode state and if the power-enabling unit receives the power-enabling signal, supplying power to the sensing unit group from the electricity-saving unit.

In an embodiment of the present invention, the above-mentioned method further includes: starting an application after entering an operation system so as to execute the setting procedure of safety mechanism through the application; and storing the unlocking information into a storage unit of the electronic apparatus.

In an embodiment of the present invention, the above-mentioned operation function is an action of starting software and further, after the step of starting the application, includes: receiving a login information corresponding to a software through the setting interface; and storing the login information into the storage unit.

In an embodiment of the present invention, after the step of judging whether or not the trigger event conforming to the unlocking information, the above-mentioned method further includes: promoting a warning signal when the trigger event does not conform to the unlocking information.

In an embodiment of the present invention, the above-mentioned electronic apparatus includes a touch screen, and the above-mentioned method further includes: displaying the setting interface on the touch screen so as to receive the setting operation through the touch screen.

Based on the depiction above, in the invention, different operation functions have different encryption methods by using any combinations of plural sensing units in a sensing unit group, which can improve the operation safety on the electronic apparatus.

In order to make the features and advantages of the present invention more comprehensible, the present invention is further described in detail in the following with reference to the embodiments and the accompanying drawings.

DESCRIPTION OF THE EMBODIMENTS

The First Embodiment

Figure 1:
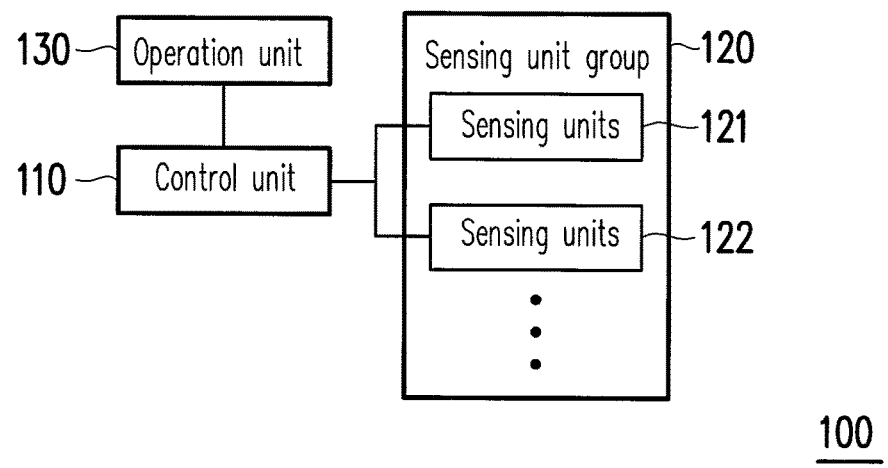
FIG. 1 is a block diagram of an electronic apparatus according to the first embodiment of the present invention.

FIG. 1 is a block diagram of an electronic apparatus according to the first embodiment of the present invention.

Referring to FIG. 1, an electronic apparatus 100 is, for example, a smart phone, a tablet computer, a notebook or a desktop and includes a control unit 110, a sensing unit group 120 and an operation unit 130.

The control unit 110 is, a system on chip (SOC), a keyboard controller (KBC) or an embedded controller (EC) and coupled to the sensing unit group 120 and the operation unit 130, and the control unit 110 can receive a trigger event of the sensing unit group 120.

The sensing unit group 120 includes a plurality of sensing units 121, 122 and so on. In FIG. 1, only two sensing units 121 and 122 are shown as an example, but the invention does not limit the quantity of the sensing units. In the embodiment, a plurality of sets of encryption methods can be set by the sensing unit groups 120, and the different encryption methods are corresponding to different operation functions. The sensing unit group 120 includes a combination of sensor units, wherein the sensor unit includes, for example, a light sensor, a proximity sensor for SAR (specific absorption rate), an infrared sensor or other proximity sensors able to sense approaching objects.

The sensing units 121 and 122 are disposed at at least one side (for example, at the outer frame of a display unit) on a plane same as the display unit (not shown) to facilitate the operations of the user. For example, referring to FIG. 2 which is a schematic diagram of the electronic apparatus according to the first embodiment of the present invention, in which the electronic apparatus 100 is a tablet computer as an example. The electronic apparatus 100 has a touch screen 210, and four sensing units 121-124 are disposed at the peripheral sides on the plane same as the touch screen 210. The disposing positions of the four sensing units 121-124 are the four corners of the outer frame of the tablet computer, or the four sensing units 121-124 are disposed at any regions of the outer frame of the tablet computer in other embodiments. In this way, the user can use the sensing units 121-124 to set different encryption methods to increase the system safety. It should be noted that the above-mentioned positions of the sensing units 121-124 are an example only, which the invention is not limited to. In fact, it can be appropriately adjusted based on different implementations. For example, one (or several ones) of the four sensing units 121-124 can be disposed on the outer frame of the tablet computer, while another one (or other ones) can be disposed on the back of the tablet computer.

The operation unit 130 is, for example, a boot firmware unit or a processing unit depending on different applications. The operation unit 130 executes a setting procedure of safety mechanism through a setting interface so as to set a unlocking information and make the unlocking information associated with an operation function. After finishing the setting procedure of safety mechanism, the operation unit 130 will further judge whether or not the trigger events of the sensing unit group 120 conform to the set unlocking information. In following, an example is depicted to explain the setting interface.

Figure 2:
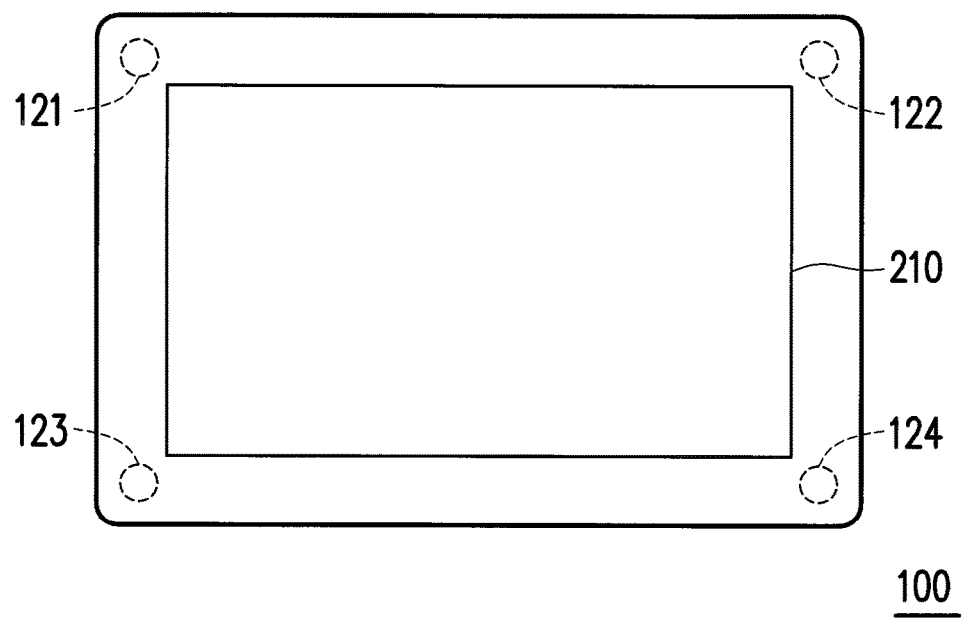
FIG. 2 is a schematic diagram of the electronic apparatus according to the first embodiment of the present invention.
Figure 3:
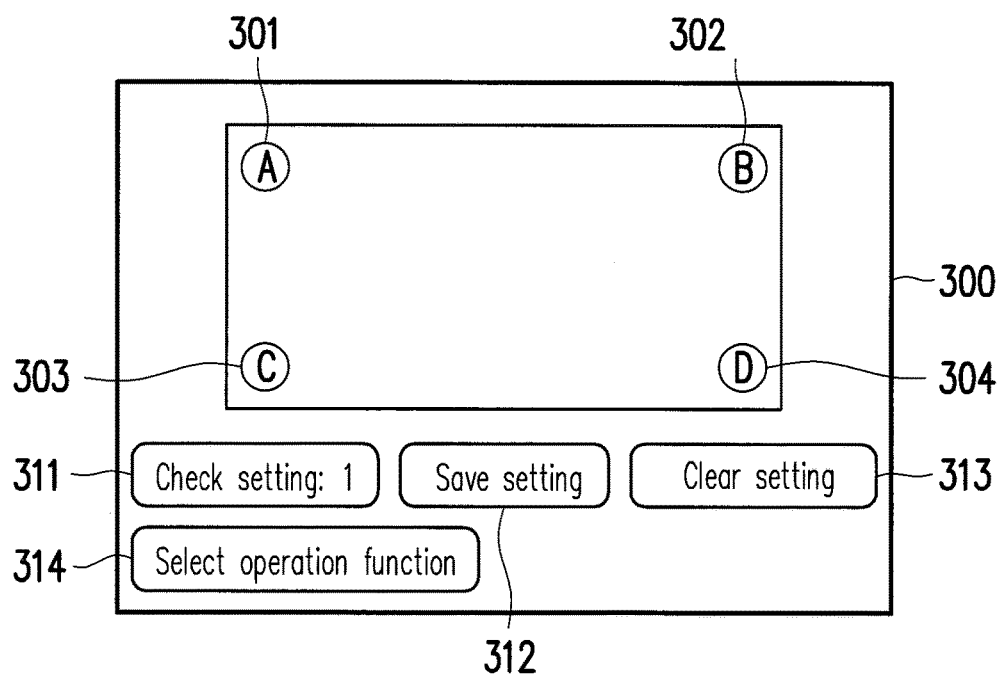
FIG. 3 is a diagram showing a setting interface according to the first embodiment of the present invention.

FIG. 3 is a diagram showing a setting interface according to the first embodiment of the present invention. Referring to FIGS. 2 and 3, corresponding to four sensing units 121-124 of the electronic apparatus 100, a setting interface 300 correspondingly includes also four setting items 301-304 therein, that is, the quantity of the setting items is corresponding to the quantity of the sensing units of the sensing unit group 120. In addition, the relative positions of the setting items 301-304 in the setting interface 300 are corresponding to the real relative positions of the sensing units 121-124 in the electronic apparatus 100. Each of the setting items 301-304 has a corresponding identifying information (for example, the identifying information used for identifying the sensing units 121-124). Each of the setting items 301-304 further is corresponding to a number, and all the setting items 301-304 are corresponding to four numbers of No. A-No. D. To facilitate the user for clicking, the relative sizes of the setting items 301-304 may not conform to the actual size proportion.

The setting interface 300 further includes four function items 311-314. The function item 311 is for displaying the setting times of the presently entered setting operations. For example, after finishing the first setting operation, the function item 311 would display "checking setting: 1". Then, when it executes the setting operation same as the last times, the function item 311 would display "checking setting: 2". The setting times can be, for example, one times, two times or three times. After fulfilling the specified setting times, the function item 312 is used to save the setting according to the unlocking information created by the setting operation. The function item 313 is used for clearing the setting operation and the function item 314 is used for selecting an operation function to be executed. For example, the function item 314 is a pull-down menu, in which the menu includes a plurality of operation functions for the user to select.

Figure 4A:
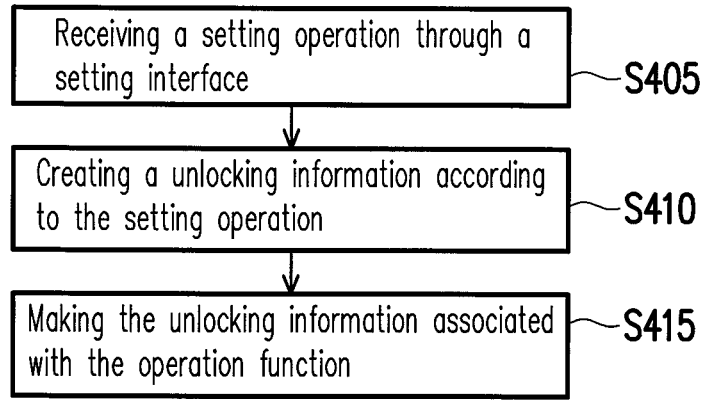
FIGS. 4A and 4B are flowcharts of a method of operating an electronic apparatus according to the first embodiment of the present invention.
Figure 4B:
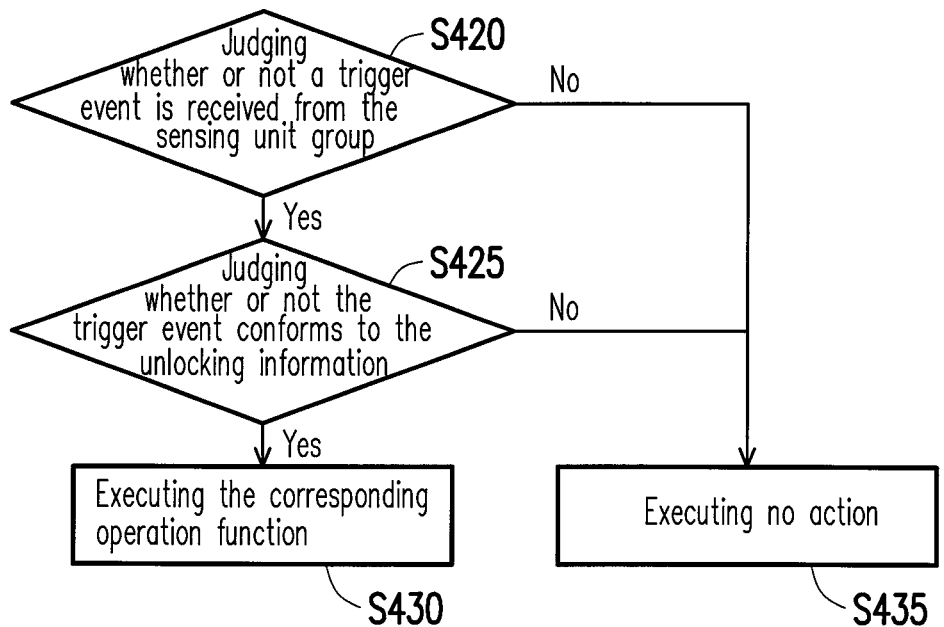

In following, the electronic apparatus 100 and the setting interface 300 are used to explain the operation flow of an electronic apparatus. FIGS. 4A and 4B are flowcharts of a method of operating an electronic apparatus according to the first embodiment of the present invention, wherein FIG. 4A shows a setting procedure of safety mechanism and FIG. 4B shows an unlocking program.

First, the sensing unit group 120 executes the setting procedure of safety mechanism. As shown by FIG. 4A, in step S405, the operation unit 130 receives a setting operation through the setting interface 300 so as to select a plurality of sensing units in the sensing unit group 120 and set the selected ones as an encrypted group. Next, in step S410, a login information is created according to the setting operation. The above-mentioned login information includes an enabling sequence of the set sensing units.

Specifically, when a touch screen or a touch pad serves as an input unit, the operation unit 130 detects the operation of the user which uses the finger thereof or a touch tip to touch the touch screen or the touch pad; when a mouse or a trackball serves as an input unit, the operation unit 130 detects the operation of the mouse or the trackball in the display unit. Then, the operation unit 130 selects a plurality of selected items from the setting items 301-304 according to the setting operation and obtains identifying information corresponding to each the selected item. In addition, the operation unit 130 detects the selecting sequence of the selected items and sets an enabling sequence for the selected sensing units according to the selecting sequence.

Taking the electronic apparatus 100 of FIG. 2 as an example, the electronic apparatus 100 has a touch screen 210. When the setting procedure of safety mechanism is enabled, the setting interface 300 can be displayed in the touch screen 210. Next, the user uses the finger thereof or a touch tip to perform a setting operation in the touch screen 210. The user can simultaneously or in different selecting sequence select a plurality of selected items (for example, setting items 302 and 304) from the setting items 301-304 (for example, through finger pressing). If the setting items 302 and 304 are simultaneously selected (for example, by the fingers to simultaneously press), the selecting sequence is set as "0" to indicate a simultaneous selection. If the setting item 302 is selected first, followed by selecting the setting item 304, the selecting sequence is set as "B, D" to indicate the selection is from B (setting item 302) and to D (setting item 304). In this way, the operation unit 130 can set the sensing units 122 and 124 as an encrypted group according to the identifying information of the setting items and set the enabling sequence of the selected sensing units 122 and 124 as "the sensing unit 122, the sensing unit 124" according to the selecting sequence "from B to D" to indicate the enabling is from the sensing unit 122 and to the sensing unit 124. Thus, the created unlocking information includes the identifying information of the sensing units 122 and 124 to be used and the enabling sequence thereof.

In the step of creating the unlocking information, the operation unit 130 can further set an sensitive time for each of the sensing units 122 and 124 to be used according to a staying time by selecting each of the above-mentioned selected items (for example, the setting items 302 and 304). The sensitive time is the second value for long-time sensing the sensing units 122 and 124 during triggering the sensing unit group 120 later. Thus, in addition to the identifying information and the enabling sequence corresponding to the selected sensing units 122 and 124, the unlocking information further includes the sensitive time of the selected sensing units 122 and 124. The user can manually input the sensitive time of each of the sensing units 122 and 124, and the present invention does not limit the obtaining way of the sensitive time.

In step S415, the operation unit 130 makes the unlocking information associated with the operation function. For example, the user can further click the function item 314 in the setting interface 300 of FIG. 3 to select an operation function and use the function item 312 to save the unlocking information, and meanwhile make the unlocking information associated with the operation function. At the time, the setting procedure of safety mechanism is completely performed.

After finishing executing the setting procedure of safety mechanism, as shown by FIG. 4B, in step S420, the operation unit 130 detects whether or not a trigger event is received from the sensing unit group 120, in which the trigger events are produced through sensing the specific operation behavior of the user by the selected sensing units in the sensing unit group 120. The specific operation behavior is, for example, the sequence for the user to touch the selected sensing units or the touching duration.

If it does not receive a trigger event, the procedure goes to step S435 without executing any action; if it detects out a trigger event is received from the sensing unit group 120, in step S425, the operation unit 130 judges whether or not the trigger event conforms to the unlocking information. In more details, in addition to that the sensing units enabled by the user must conform to the set unlocking information, the enabling sequence thereof must conform to the unlocking information as well, and then it is decided the trigger event conforms to the unlocking information; or, it needs to further judge whether or not the sensitive time conforms to the unlocking information so as to decide that the trigger event conforms to the unlocking information.

If the trigger event conforms to the unlocking information, in step S430, the operation unit 130 executes the corresponding operation function; otherwise, it executes step S435 without executing any action.

In following, two embodiments are described to explain the implementations of the operation unit 130 by using a boot firmware unit or a processing unit.

The Second Embodiment

The operation function of the embodiment is a boot action, which is, for example, to execute the setting procedure of safety mechanism by using a boot firmware unit so that it is not needed to enter the operation system for setting.

Figure 5:
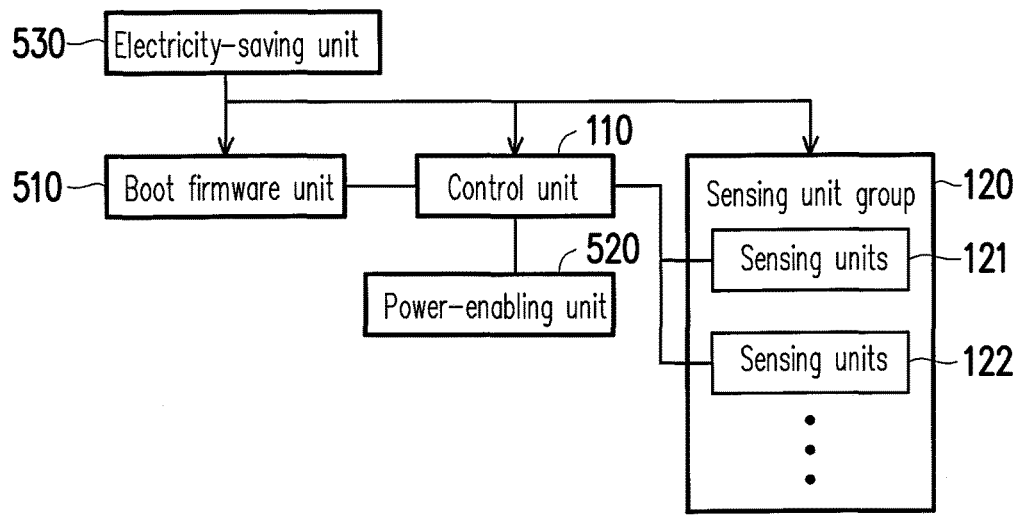
FIG. 5 is a block diagram of an electronic apparatus according to the second embodiment of the present invention.

FIG. 5 is a block diagram of an electronic apparatus according to the second embodiment of the present invention. An electronic apparatus 500 includes a control unit 110, a sensing unit group 120, a boot firmware unit 510, a power-enabling unit 520 and an electricity-saving unit 530. In the embodiment, the control unit 110 is coupled to the sensing unit group 120, the boot firmware unit 510 and the power-enabling unit 520. The boot firmware unit 510 herein is used to implement the operation unit 130. In following, the same reference numbers as the ones in the first embodiment are used in the drawings and the description to refer to the same or like parts and the related depiction is omitted.

The boot firmware unit 510 includes a boot firmware, and the boot firmware includes code snippets for the setting procedure of safety mechanism. The boot firmware unit 510 is used to execute the setting procedure of safety mechanism. The boot firmware is, for example, basic input output system (BIOS), extensible firmware interface (EFI) BIOS or unified extensible firmware interface (UEFI) BIOS.

The power-enabling unit 520 is, for example, a power key. The electricity-saving unit 530 is coupled to the control unit 110, the sensing unit group 120, the boot firmware unit 510 and the power-enabling unit 520. When the electronic apparatus 500 is under a shutdown mode state, the electricity-saving unit 530 supplies power to the control unit 110, the boot firmware unit 510 and the power-enabling unit 520. When the electronic apparatus 500 is under the shutdown mode state and if the control unit 110 receives a power-enabling signal from the power-enabling unit 520, the control unit 110 makes the electricity-saving unit 530 supply power to the sensing unit group 120.

Figure 6:
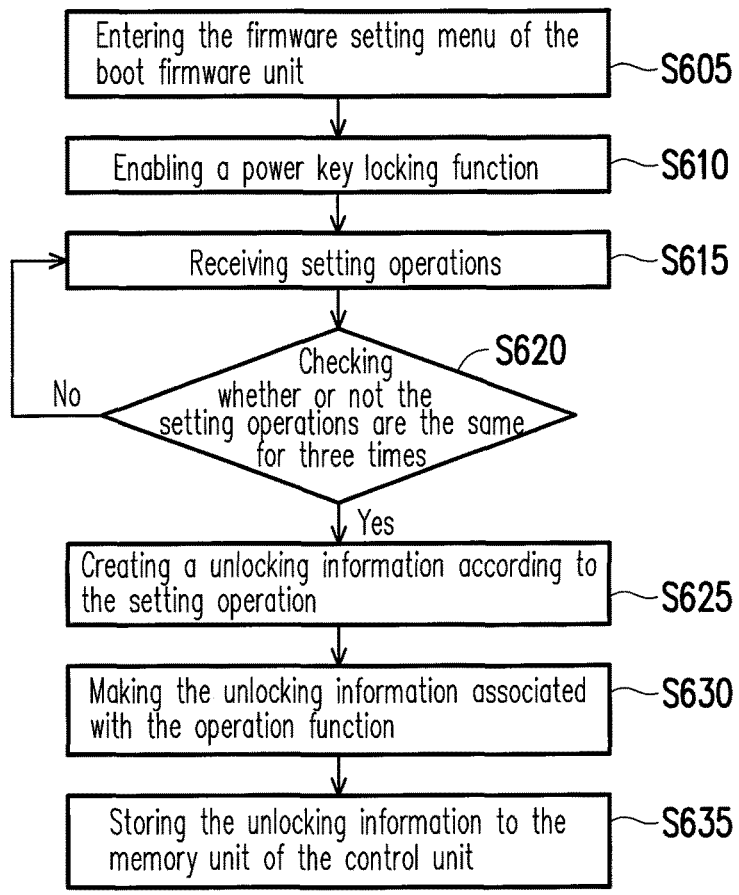
FIG. 6 is a flowchart for executing a setting procedure of safety mechanism according to the second embodiment of the present invention.
Figure 7A:
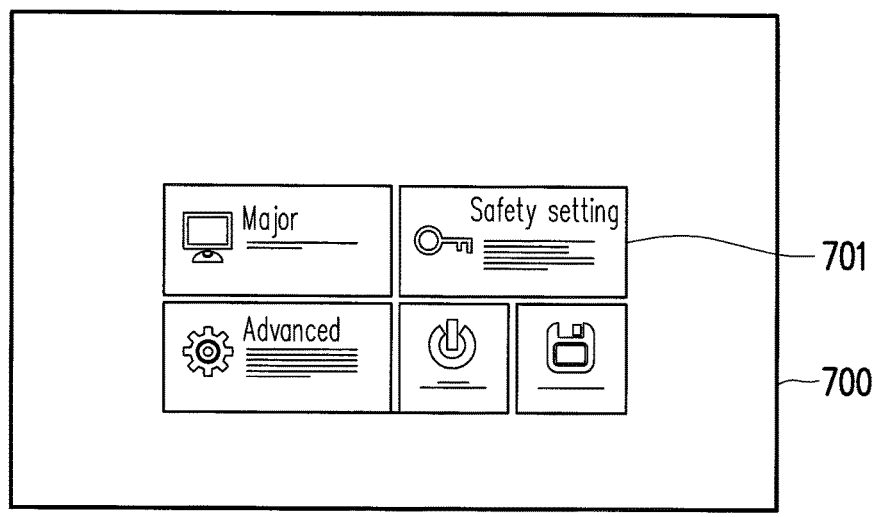
FIGS. 7A and 7B are diagrams showing a setting interface according to the second embodiment of the present invention.
Figure 7B:
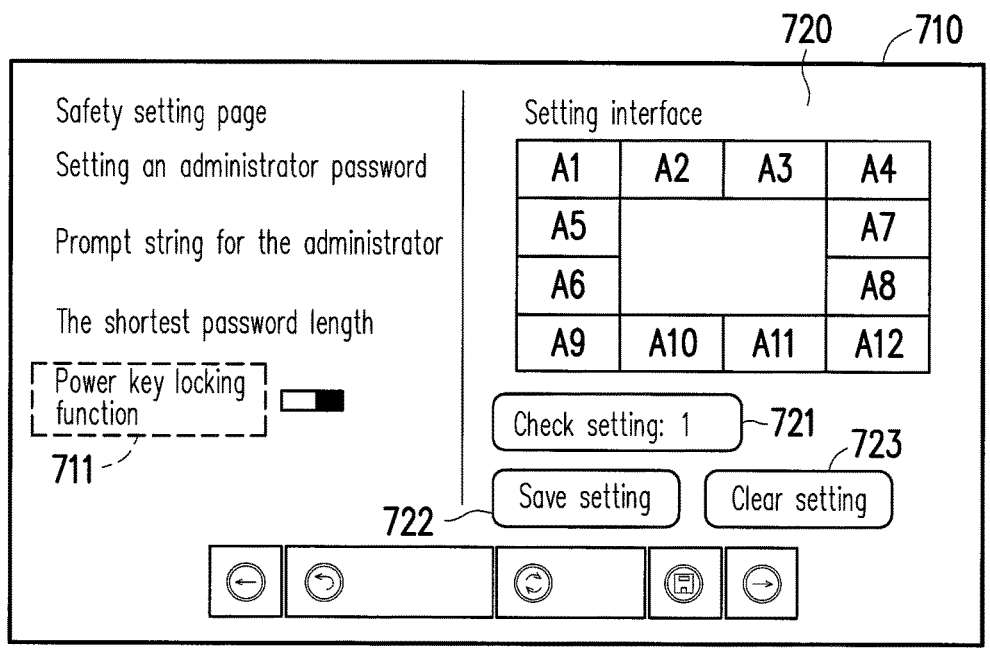

FIG. 6 is a flowchart for executing a setting procedure of safety mechanism according to the second embodiment of the present invention and FIGS. 7A and 7B are diagrams showing a setting interface according to the second embodiment of the present invention, wherein FIG. 7A shows a firmware setting menu 700 and FIG. 7B shows a safety setting page 710. In following, the flow of executing the setting procedure of safety mechanism is described in association with FIGS. 7A and 7B.

In step S605, the electronic apparatus 500 enters the setting interface of the boot firmware unit 510. For example, the user presses down the power-enabling unit 520 and enables the related function key in the booting frame to enter the firmware setting menu 700 shown by FIG. 7A. The firmware setting menu 700 has an option 701 ("safety setting") related to the setting procedure of safety mechanism. When the user selects the "safety setting" option 701 shown by FIG. 7A, the frame is switched to a safety setting page 710 shown by FIG. 7B, which has two fields (left field and right field). The left field has the safety options to be set and the right field is the setting interface corresponding to the selected safety options.

Then in step S610, the boot firmware unit 510 enables a power key locking function. When, for example, the function item 711 of "power key locking function" is enabled, the right field, as shown by FIG. 7B, shows out a setting interface 720 for the user to set the unlocking information in the setting interface 720. If the function item 711 of "power key locking function" is disabled, the setting interface 720 is not displayed. If the function item 711 of "power key locking function" is enabled, the setting interface 720 is shown for the user to select sensing units to be used. In the embodiment, the electronic apparatus 500 has 12 different sensing units disposed at the four frame edges of the screen, so that 12 setting items A1-A12 are displayed in the setting interface 720. The setting interface 720 further includes three function items 721-723, which can be understood respectively referring the function items 311-313 in FIG. 3, which is omitted to describe.

In step S615, the boot firmware unit 510 receives setting operations through the setting interface 720. For example, the 12 sensing units of the electronic apparatus 500 respectively have a corresponding storage space in the memory units of the control unit 110. The 12 sensing units are assigned respectively with a number and the initial state of the corresponding space is set as "0". Assuming the setting interface 720 is used to select the setting items A1, A5, A6 and A9, and the initial states of the sensing units corresponding to the setting items A1, A5, A6 and A9 are changed as "1", followed by setting the enabling sequence of the sensing units and the sensitive time.

Then in step S620, the boot firmware unit 510 checks whether or not the setting operations are the same for three times. For example, assuming the setting interface 720 is used to sequentially select the setting items A1, A5, A6 and A9, then, two more times are needed to select the same setting items A1, A5, A6 and A9 sequentially so as to save the group of settings. However, the step can be omitted in other embodiments or the setting times are changed to twice, which the present invention is not limited to.

In step S625, the boot firmware unit 510 creates a unlocking information according to the setting operation. Then in step S630, the boot firmware unit 510 makes the unlocking information associated with the operation function. The details of steps S625 and S630 can refer to steps S410 and S415 of FIG. 4A, which is omitted to describe.

Finally in step S635, the boot firmware unit 510 stores the unlocking information to the memory unit of the control unit 110 or to a mailbox memory. After that, whenever booting the electronic apparatus every time, the safety mechanism is followed. In following, another embodiment is depicted to explain the operation method of reusing the same safety mechanism.

Figure 8:
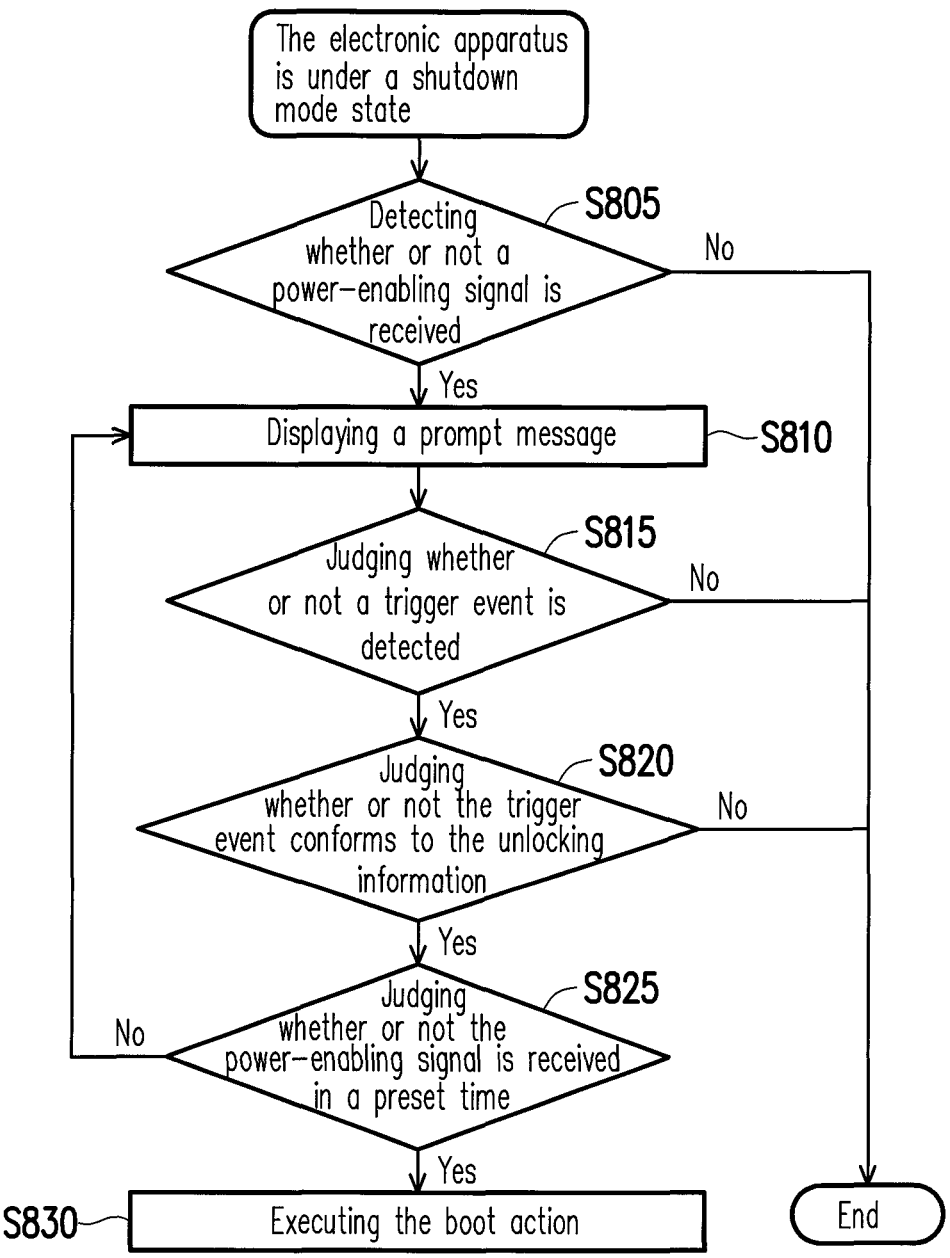
FIG. 8 is a flowchart of a method of operating an electronic apparatus according to the second embodiment of the present invention.

FIG. 8 is a flowchart of a method of operating an electronic apparatus according to the second embodiment of the present invention. Referring to FIGS. 5 and 8, the electronic apparatus 500 is under the shutdown mode state, as shown in step S805, the control unit 110 detects whether or not the power-enabling signal is received from the power-enabling unit 520. Under the shutdown mode state, if the power-enabling signal is not received, the procedure is ended.

On the other hand, under the shutdown mode state, if the control unit 110 receives the power-enabling signal from the power-enabling unit 520, in step S810, the boot firmware unit 510 makes a prompt message displayed at the display unit (for example, the touch screen) so as to remind the user for performing decryption. In more details, when the electronic apparatus 500 is under the shutdown mode state, if the control unit 110 receives the power-enabling signal from the power-enabling unit 520, the control unit 110 delivers a notice signal to the boot firmware unit 510 so as to make a prompt message displayed at the display unit through the boot firmware unit 510.

In addition, under the shutdown mode state, if the control unit 110 receives the power-enabling signal from the power-enabling unit 520, the control unit 110 further makes the electricity-saving unit 530 supply power to the sensing unit group 120 to allow the sensing unit group 120 running.

Then in step S815, the control unit 110 judges whether or not a trigger event is detected from the sensing unit group 120. When the control unit 110 receives the trigger event from the sensing unit group 120, in step S820, the control unit 110 judges whether or not the trigger event conforms to the unlocking information. If the trigger event does not conform to the unlocking information, the procedure is ended.

If the trigger event conforms to the unlocking information, in step S825, the control unit 110 judges whether or not the power-enabling signal will be received again in a preset time (for example, 30 seconds). If the power-enabling signal is received again in the preset time, in step S830, the boot firmware unit 510 executes the boot action. If the power-enabling signal is not received again in the preset time, the procedure goes back to step S810, and the boot firmware unit 510 displays the above-mentioned prompt message to remind the user for performing decryption again.

In the second embodiment, under the shutdown mode state, once the user simply presses down the power-enabling unit 520 (the power key), the electronic apparatus 500 is not turned on, because the control unit 110 holds up the power-enabling signal at the time. In order to boot the electronic apparatus under the shutdown mode state, the decryption must be performed first, i.e., after the control unit 110 receives the trigger event conforming to the unlocking information from the sensing unit group 120, the user must press down the power-enabling unit 520 again for booting. If the power-enabling signal is not received over the preset time, the decryption must be executed again so as to use the power-enabling unit 520 for booting.

The Third Embodiment

In the embodiment, after the electronic apparatus is booted and enters an operation system, a sensor setting control application (briefed as SSC application in following) is installed so as to use the SSC application to execute the setting procedure of safety mechanism.

Figure 9:
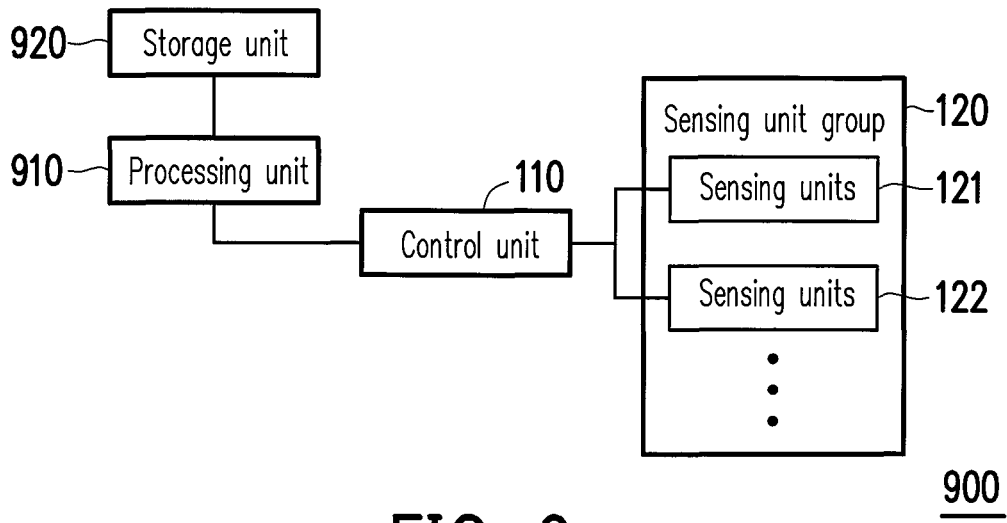
FIG. 9 is a block diagram of an electronic apparatus according to the third embodiment of the present invention.

FIG. 9 is a block diagram of an electronic apparatus according to the third embodiment of the present invention. An electronic apparatus 900 includes a control unit 110, a sensing unit group 120, a processing unit 910 and a storage unit 920. The processing unit 910 herein is used to implement the operation unit 130 of the first embodiment. In following, the same reference numbers as the ones in the first embodiment are used in the drawings and the description to refer to the same or like parts and the related depiction is omitted.

The processing unit 910 is coupled to the control unit 110 and the storage unit 920. The storage unit 920 has a SSC application stored therein, and the processing unit 910 executes the SSC application to finish the setting procedure of safety mechanism and to judge the decryption action.

Figure 10:
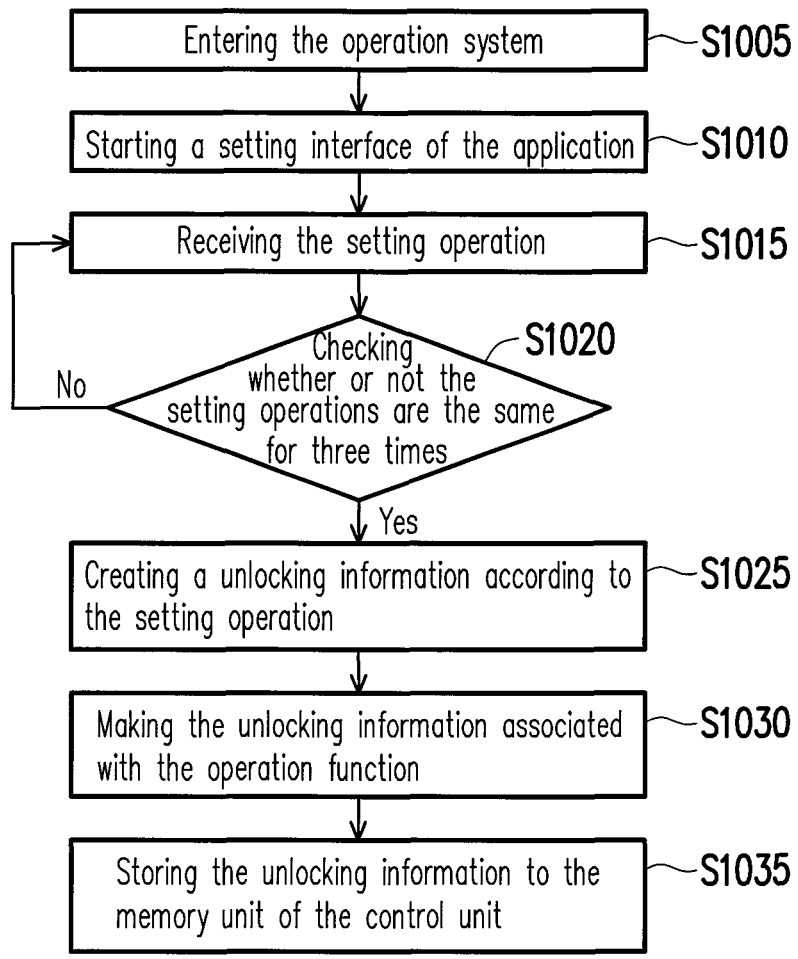
FIG. 10 is a flowchart for executing a setting procedure of safety mechanism according to the third embodiment of the present invention.
Figure 11:
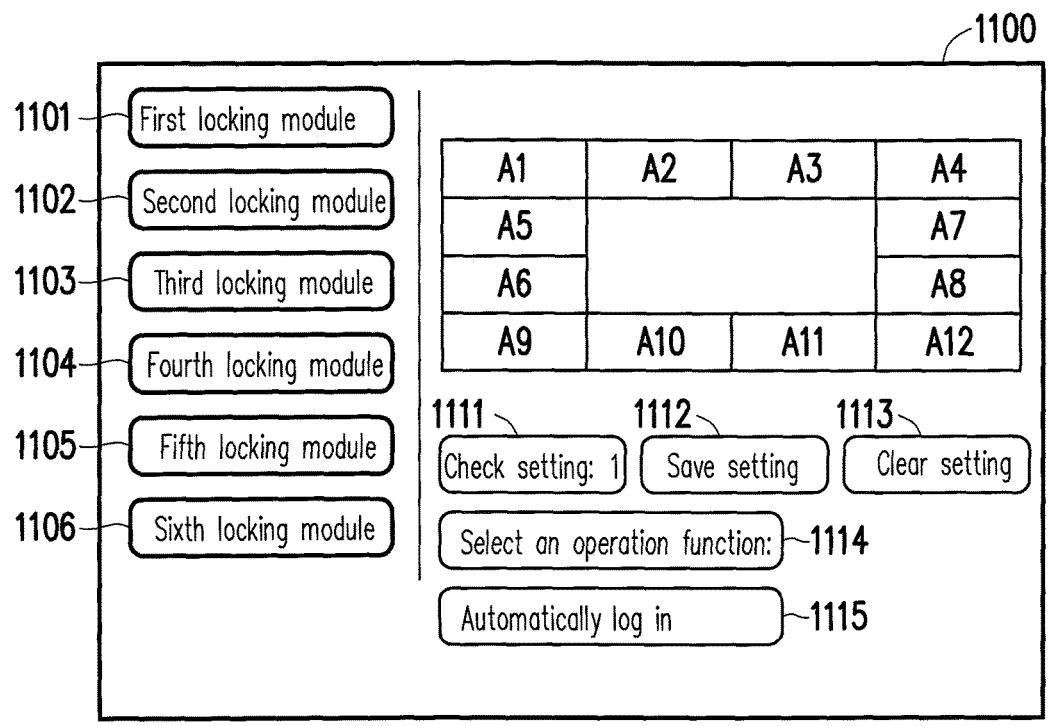
FIG. 11 is a diagram showing a setting interface according to the third embodiment of the present invention.

FIG. 10 is a flowchart for executing a setting procedure of safety mechanism according to the third embodiment of the present invention. FIG. 11 is a diagram showing a setting interface according to the third embodiment of the present invention. In following the setting procedure of safety mechanism is executed in association with FIG. 11.

First in step S1005, the electronic apparatus 900 is boot and enters the operation system. Next in step S1010, the processing unit 910 starts a setting interface 1100 of the SSC application. The left field of the setting interface 1100 includes a first locking module 1103 to a sixth locking module 1106, i.e., the user can set six groups of safety modes. There are 12 different sensing units disposed at the four frame edges of the screen of the electronic apparatus 900, and at the time, the right field displays 12 setting items A1-A12. The setting interface 1100 further includes five function items 1111-1115, in which the functions of the function items 1111-1114 can refer to the function items 311-314 of FIG. 3, and is omitted to describe. The function item 1115 is used for selecting whether or not to automatically login a specified software when the operation function is "starting the specified software". For example, in the setting interface 1100, a login information of the specified software is received in advance and then the login information is stored in the storage unit 920.

Then in step S1015, the setting operation is received through the setting interface 1100 so as to select a plurality of sensing units in the sensing unit group 120 and the sensing units serve as an encrypted group. Taking the third locking module 1103 as an example, after the user clicks the third locking module 1103 at the left field, the user can simultaneously select or sequentially select different setting items at the right field. For example, the user can use the finger to simultaneously click the setting items A9, A10 and A12; or the user can sequentially click the setting items A1, A10, A3 and A8.

Then in step S1020, the processing unit 910 checks whether or not the setting operation is the same for three times, which however can be omitted in other embodiment, or the checking times can be reduced to twice, which the present invention is not limited to. Then in step S1025, the processing unit 910 creates the unlocking information according to the setting operation. In step S1030, the unlocking information is associated with the operation function. The depiction of steps S1025 and S1030 can refer to steps S410 and S415 in FIG. 4A, which is omitted to describe. When finishing setting the unlocking information and the corresponding operation function, in step S1035, the processing unit 910 stores the unlocking information in the storage unit 920.

At the time, it needs to repeatedly confirm the setting operation for three times to make the above-mentioned encrypted group (for example, the third locking module 1103) in effect. When the third locking module 1103 is in effect, it is selected in the pull-down menu of the function item 1114 that which operation function the third locking module 1103 is going to execute. In addition, the login information can be entered in the function item 1115.

Yet another embodiment is described in following to explain the above-mentioned operation method of safety mechanism after finishing the setting procedure of safety mechanism.

Figure 12:
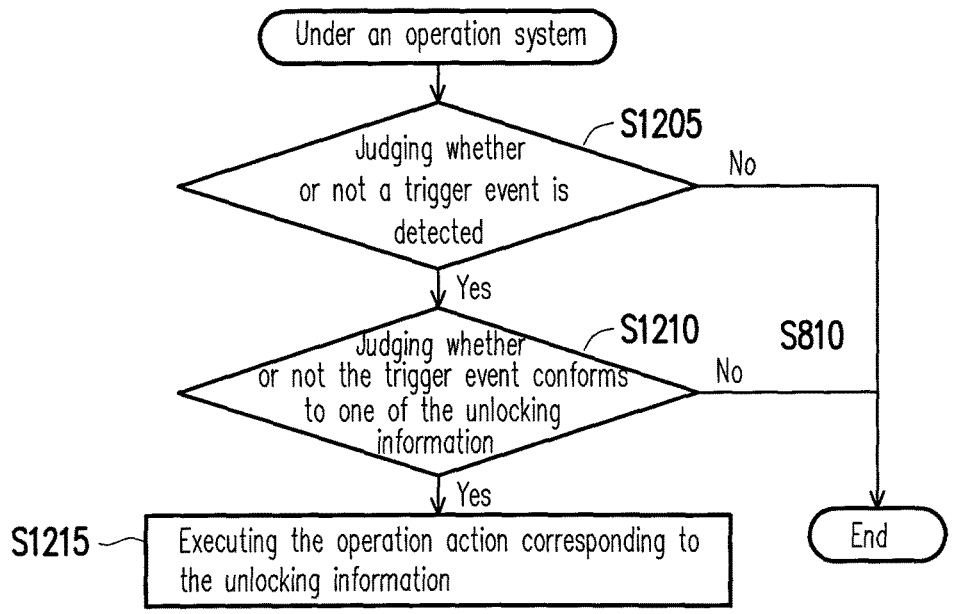
FIG. 12 is a flowchart of a method of operating an electronic apparatus according to the third embodiment of the present invention.

FIG. 12 is a flowchart of a method of operating an electronic apparatus according to the third embodiment of the present invention. Referring to FIGS. 9 and 12, after the electronic apparatus 900 is booted and enters the operation system, in step S1205, the processing unit 910 judges whether or not a trigger event is detected out, i.e., it is judged whether or not the control unit 110 receives a trigger event from the sensing unit group 120. If the trigger event is not received, the procedure is ended. If the trigger event is received, in step S1210, the processing unit 910 judges whether or not the trigger event conforms to one of the set unlocking information. If the trigger event does not conform to any unlocking information, it can further remind a warning signal. If the trigger event conforms to one of the unlocking information, in step S1215, the operation action corresponding to the unlocking information is executed.

In this way, after the electronic apparatus 900 is booted and executes the SSC application, the 12 sensing units disposed at the electronic apparatus 900 can be used at any time to set a locking module to achieve the corresponding operation function. The operation function to be realized can be any function of BIOS, KBC, operating system or other applications, which can be finished by the hand-shaking between the above-mentioned SSC application and the BIOS, the KBC, the operating system or other applications.

With the operation system together with the self-developed SSC application, the different operation functions are correspondingly set by using plural different sensing units with simultaneous pressing down or different enabling sequences. For example, simultaneously pressing down the three ones among the above-mentioned sensing units, it logs on a specified software, wherein the login information (such as account number and password) of the specified software has been stored in the SSC application. When the user wishes to log in the specified software, the routine of entering the account number and the password can be omitted, and the user can log in directly by simultaneously pressing down the three ones among the above-mentioned sensing units.

In summary, in the above-mentioned embodiments, different operation functions have different encryption methods by using any combinations of plural sensing units in a sensing unit group, which can advance the operation safety on the electronic apparatus. Since different combinations of plural sensing units can gain the advantage of safety mechanism, therefore, during setting the corresponding operation functions, it can make the operation functions needing the safety mechanism bound together. In addition, the method of setting a safety mechanism by the sensing units is quite helpful for the handheld electronic apparatus such as the tablet computer or the mobile phone. Considering the above-mentioned handheld electronic apparatus has limited physical keys, the implementation way of the invention through different permutations and combinations of plural sensing units can accordingly increase the quantity of the operation functions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of operating an electronic apparatus, wherein the electronic apparatus comprises a sensing unit group having a plurality of sensors, a boot firmware, a power key, a touch screen, and a controller coupled to the power key, the boot firmware and the touch screen, and the method comprises:

receiving a setting operation corresponding to a specific operation behavior through a setting interface of the electronic apparatus so as to select a plurality of ones among the sensors in the sensing unit group;

creating an unlocking information according to the setting operation, wherein the unlocking information comprises an enabling sequence of the selected sensors;

delivering a notice signal to the boot firmware by the controller if the controller receives a power-enabling signal from the power supply when the electronic apparatus is under a shutdown mode state;

displaying a prompt message at the touch screen through the boot firmware;

receiving a trigger event, wherein the trigger event is generated by the sensors selected in the sensing unit group to sense the specific operation behavior of a user;

judging whether or not the trigger event conforms to the unlocking information; and when the trigger event conforms to the unlocking information, judging whether or not receiving the power-enabling signal once again from the power supply within a preset time period after the trigger event conforming to the unlocking information;

executing a boot action through the boot firmware if receiving the power-enabling signal within the preset time period; and displaying the prompt message at the touch screen through the boot firmware if not receiving the power-enabling signal within the preset time period.

2. The method according to claim 1, wherein before the step of receiving the trigger signal, further comprises: executing a setting procedure of safety mechanism, and the setting procedure of safety mechanism comprises:

making the unlocking information associated with the operation function.

3. The method according to claim 2, wherein the setting interface comprises a plurality of setting items wherein the quantity of the setting items is corresponding to the quantity of the sensors of the sensing unit group, the setting items respectively have a corresponding identifying information, and relative positions of the setting items in the setting interface are corresponding to real relative positions of the sensors comprised by the sensing unit group at the electronic apparatus;

wherein the step of creating the unlocking information according to the setting operation comprises:

selecting a plurality of selected items among the setting items according to the setting operation and obtaining the identifying information corresponding to each of the selected items;

detecting a selecting sequence of the selected items; and setting the enabling sequence of the selected sensors according to the selecting sequence.

4. The method according to claim 3, wherein the unlocking information further comprises a sensitive time of each of the selected sensors, and the step of creating the unlocking information according to the setting operation further comprises:

setting the sensitive time according to a staying time by selecting each of the selected items.

5. The method according to claim 2, further comprising:

executing the setting procedure of safety mechanism through a boot firmware; and storing the unlocking information into a first memory of a controller.

6. The method according to claim 2, further comprising:

displaying the setting interface on the touch screen so as to receive the setting operation through the touch screen.

7. The method according to claim 2, further comprising:

starting an application after entering an operation system so as to execute the setting procedure of safety mechanism through the application; and storing the unlocking information into a second memory of the electronic apparatus.

8. The method according to claim 7, further comprising: after the step of starting the application, receiving a login information corresponding to a software through the setting interface; and storing the login information into the second memory.

9. The method according to claim 1, wherein when the electronic apparatus is under the shutdown mode state, an power supply supplies power to the controller and the boot firmware; when the electronic apparatus is under the shutdown mode state and if the power key receives the power-enabling signal, the method further comprises:
supplying power to the sensing unit group from the power supply.

10. The method according to claim 1, wherein after the step of judging whether or not the trigger event conforming to the unlocking information, the method further comprises:
promoting providing a warning signal when the trigger event does not conform to the unlocking information.

* * * * *